US007944477B1

(12) United States Patent
Birkeli

(10) Patent No.: US 7,944,477 B1
(45) Date of Patent: May 17, 2011

(54) USING A PORTION OF DIFFERENTIAL SIGNAL LINE TO PROVIDE AN EMBEDDED COMMON MODE FILTER

(75) Inventor: Inge Lars Birkeli, Lunner (NO)

(73) Assignee: Oracle America, Inc., Redwood Shores, CA (US)

( * ) Notice: Subject to any disclaimer, the term of this patent is extended or adjusted under 35 U.S.C. 154(b) by 1372 days.

(21) Appl. No.: 11/453,760

(22) Filed: Jun. 14, 2006

(51) Int. Cl.
*H04N 5/232* (2006.01)

(52) U.S. Cl. ..................... 348/211.1; 348/241; 348/374; 257/99

(58) Field of Classification Search ............... 348/211.1, 348/211.5, 241, 374; 257/99, 208, 665
See application file for complete search history.

(56) References Cited

U.S. PATENT DOCUMENTS

| | | | | |
|---|---|---|---|---|
| 2003/0001172 | A1* | 1/2003 | O'Mahony et al. | 257/208 |
| 2005/0121684 | A1* | 6/2005 | Aruga et al. | 257/99 |
| 2005/0162184 | A1* | 7/2005 | Shibata et al. | 326/30 |
| 2006/0087379 | A1* | 4/2006 | Bartley et al. | 333/5 |

* cited by examiner

*Primary Examiner* — Gevell Selby
(74) *Attorney, Agent, or Firm* — Park, Vaughn, Fleming & Dowler LLP

(57) ABSTRACT

In order to provide filtering of clock noise from an integrated circuit at least one differential signal line connected to the integrated circuit is provided with an embedded common mode filter. The common mode filter can be provided in the form of a hollowed out portion of an impedance reference plane.

14 Claims, 6 Drawing Sheets

USING A PORTION OF DIFFERENTIAL SIGNAL LINE TO PROVIDE AN EMBEDDED COMMON MODE FILTER

BACKGROUND

The invention relates to providing common mode noise filtering for integrated circuits.

Where noise that exists in an integrated circuit (IC), for example on ground and power lines within an IC, is coupled to the environment, this can result in electromagnetic interference (EMI) problems.

For example, where there are a large number of outputs (e.g., a large number of serializer/deserializers (SerDes)) in an IC that are clocked from a common clock reference source, this can contribute significantly to the noise level on ground and power within the IC. Then, where all output drivers of the SerDes are active, the ground noise can end up being coupled to the environment through low common mode impedance differential lines to an extent that can cause significant EMI problems.

The present invention seeks at least to mitigate such problems.

SUMMARY

An aspect of the present invention can provide a circuit board that is configured to have an integrated circuit mounted thereon and includes at least one differential signal line to be connected to the integrated circuit. The differential signal line can be provided with a first portion having a higher common mode impedance than another portion of the differential signal line, whereby the portion of higher common mode impedance can be configured to provide a common mode noise filter.

An aspect of the present invention can provide a method of filtering clock noise from an integrated circuit, the method including the provision of at least one differential signal line that is connected to the integrated circuit and is provided with an embedded common mode filter.

Although specific combinations of features are identified in the independent and dependent claims, it will be appreciated that embodiments of the invention may include combinations of the features of the independent and dependent claims other than those specifically identified by the dependencies of the accompanying claims.

BRIEF DESCRIPTION OF THE FIGURES

Specific embodiments of the present invention will now be described by way of example only with reference to the accompanying Figures in which.

Figure 1:
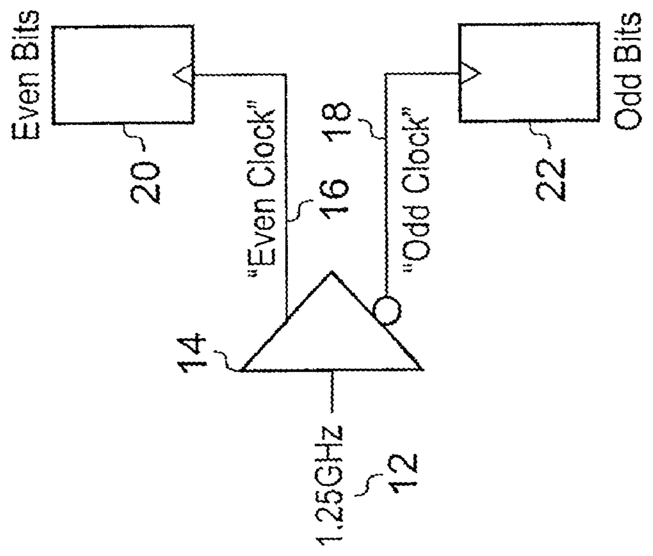
FIG. 1 is a schematic representation of clock signal circuitry.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

An embodiment of the present invention will be described in the following.

FIG. 1 is a schematic representation of clock signal circuitry for illustrating the generation of power system clock noise, for example in a 2.5 Gbps system. As represented in FIG. 1, a 1.25 GHz fundamental clock signal 12 is provided to a differential amplifier 14 from which an even clock signal 16 and an odd clock signal 18 are generated. First circuitry 20 for even bits is responsive to the even clock signal 16 and second circuitry 22 for odd bits is responsive to the odd clock signal 18.

Figure 2:
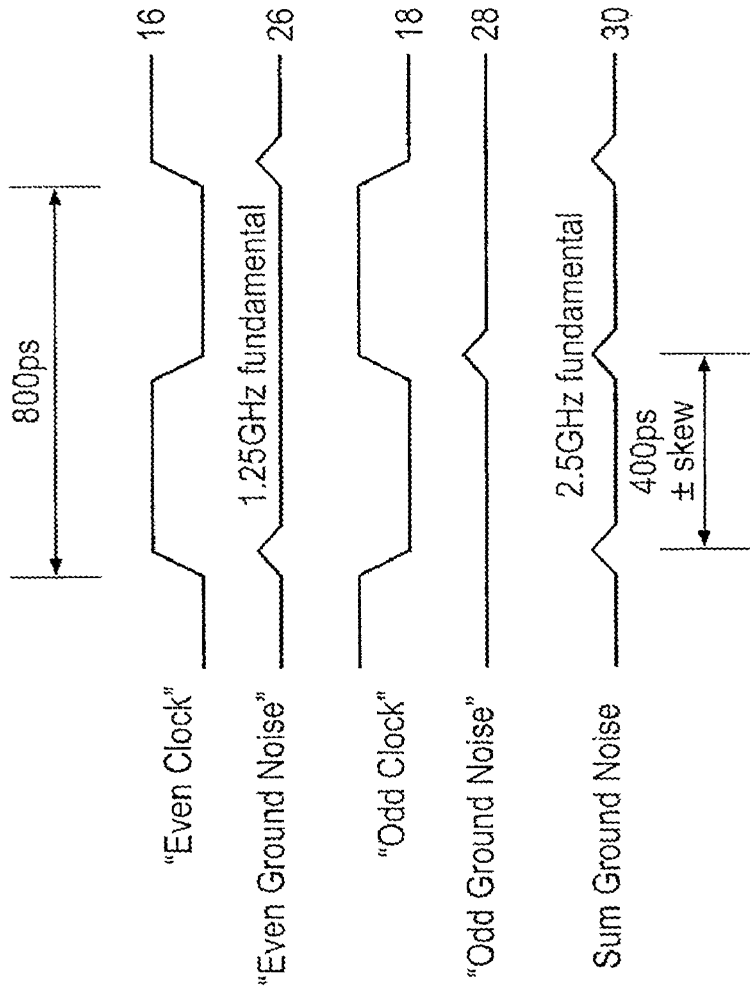
FIG. 2 is a schematic signal diagram representing various clock and noise signals associated with the circuitry of FIG. 1.

FIG. 2 is a schematic signal diagram representing various clock and noise signals associated with the circuitry of FIG. 1, including part of an example of an even clock signal 16 and an odd clock signal 18. It can be seen in FIG. 2 that the odd clock signal 18 is inverted with respect to the even clock signal 16 from the respective outputs of the differential amplifier 14. The cycle of each of the even and odd clock signals is 800 ps for a fundamental clock frequency of 1.25 GHz.

As further shown in FIG. 2, an even ground noise signal 26 with a noise peak corresponding to the positive transition of the even clock signal has a 1.25 GHz fundamental frequency. FIG. 2 also illustrates an odd ground noise signal 28 which has a peak corresponding to the positive transition of the odd clock signal 18. Each of the even ground noise signal 26 and the odd ground noise signal 28 has a 1.25 GHz fundamental frequency. The combination of the even ground noise signal 26 and the odd ground noise signal 28 results in a total, or sum, ground noise signal 30 having a 2.5 GHz fundamental frequency with 400 ps between peaks, plus or minus a skew factor.

As illustrated in FIG. 2, the fundamental frequency of the sum, or total, ground noise will be equal to the bit rate in a system where odd and even bits are clocked at the two different edges of a half-bit rate frequency PLL clock. In the example in FIG. 1 where the PLL clock has a fundamental frequency of 1.25 GHz, the fundamental bit rate frequency and the fundamental frequency of the total ground noise is 2.5 GHz.

Figure 3:
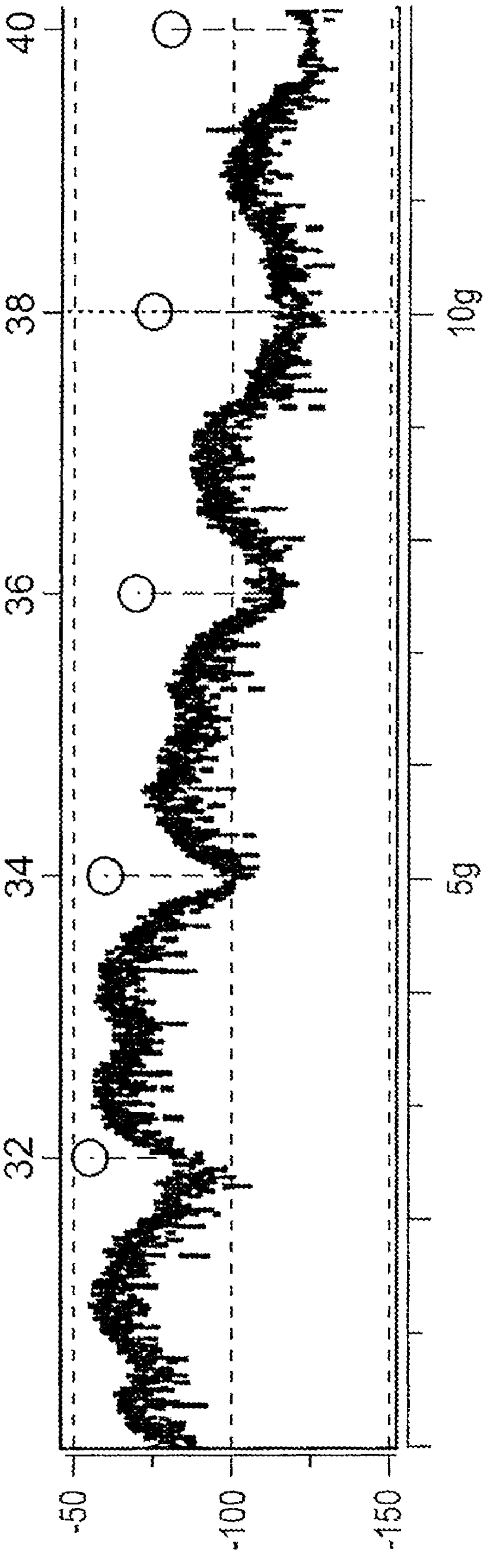
FIG. 3 is a representation of a spectrum of common mode noise at the outputs of an IC.

The spectrum of this sort of "spike" noise often contains both odd and even harmonics. FIG. 3 provides an illustration of a common mode spectrum at the outputs (e.g., output pins) of an example of an integrated circuit having clock signal circuitry such as that illustrated in FIG. 1, where the clock noise appears at 32, 34, 36, 38 and 40 at, respectively, the peaks at 2.5, 5, 7.5, 10 and 12.5 GHz.

This clock noise is typically stable, continuous and equal on all signal lines, and thus does not average in time. The common mode noise from other data transients varies with data patterns and averages. As a result, the clock noise from all outputs can easily add to each other and emit an electromagnetic interference (EMI) field of a significant amount. These frequencies can be difficult to shield when they are emitted from an integrated circuit. An embodiment of the present invention seeks to mitigate the effect of such frequencies spreading out on a printed circuit board by reducing the amplitudes of such noise signals by filtering. Although the use of discrete components for filtering would be possible, this can prove difficult in practice and expensive, as a result of the cost and real estate required for accommodating the discrete components.

Figure 4:
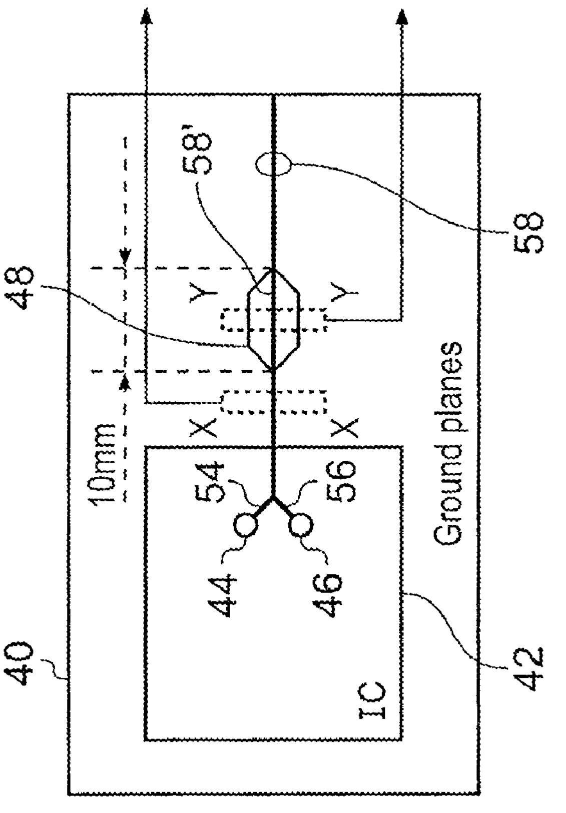
FIG. 4 is a schematic plan view of an example of a common mode filter embedded in signal layers of a circuit board.

FIG. 4 is a schematic plan view of an example of an embedded stripline filter in an example of a circuit board. FIG. 4 is a schematic diagram only, for illustrating the present invention. Thus, a printed circuit board (PCB) 40 has, mounted thereon, an integrated circuit (IC 42) that includes at least first and second contacts (e.g., contact pins) 44 and 46. Each of the contacts 44 and 46 is connected to a respective conductive line 54 and 56 of a differential signal line 58 formed by the combination of the individual lines 54 and 56. The individual lines 54 and 56 of the differential signal line 58 are configured between first and second impedance reference planes (also known as ground planes) 64 and 66.

Figure 5:
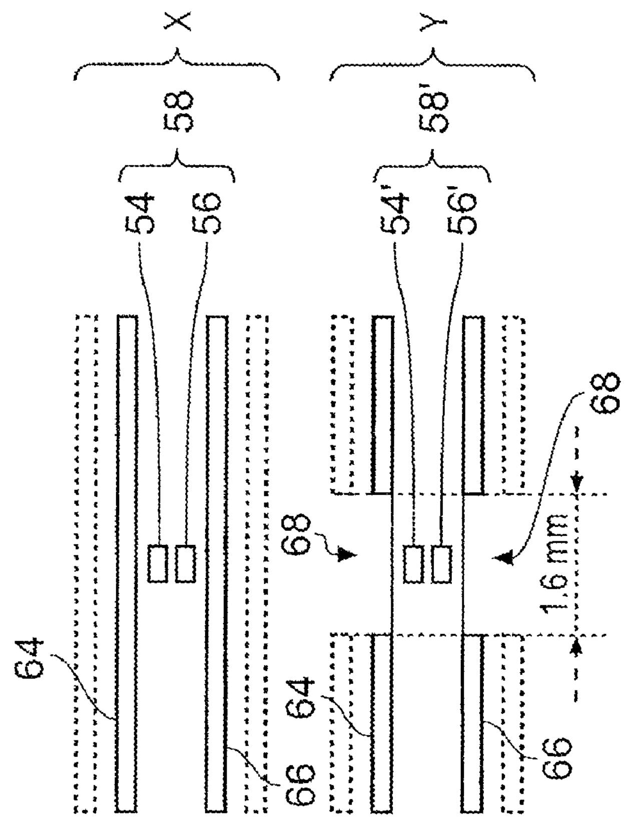
FIG. 5 represents cross sections through the circuit board of FIG. 3.

FIG. 5 provides first and second schematic cross sections through the printed circuit board 40 showing the individual signal lines 54 and 56 of the differential signal line 58 located between the impedance reference planes 64 and 66. In the configuration shown in FIG. 5, the differential signal line has a low common mode impedance, for example on the order of 35 ohm.

The upper cross section X of FIG. 5 represents a cross section taken within the dotted lines at x-x in FIG. 4. The lower cross section Y of FIG. 5 represents a cross section taken within the dotted lines at y-y in FIG. 4.

As illustrated in FIG. 5, a portion 48 of the impedance reference planes 64 and 66 are hollowed out in the region of a portion of the differential signal line where it is intended to increase the common mode impedance of that line. The hollowing out of the impedance reference planes is shown in the cross section Y of FIG. 5 at 68. In the example shown in FIGS. 4 and 5, an example of a hollowed out portion 48 with a length along the differential signal line of approximately 10 millimeters and a width of approximately 1.6 millimeters is provided.

Although cross section Y of FIG. 5 represents a hollow formed with respect to each of two impedance reference planes 64 and 66, in another example a hollow may be provided in the region of only one of the impedance reference planes 64 or 66, for example on one side only of the printed circuit board 40.

As can also be seen by a comparison of the cross sections X and Y in FIG. 5, the width of the individual signal lines 54 and 56 of the differential signal line 58 is increased in the region of the hollowed out portion 48 of the impedance reference planes 64 and 66 with respect to the width of the individual signal lines 54 and 56 of the differential signal line 58 outside that portion of the impedance reference planes 66 and 68. As a result of providing the hollowed out portion, a portion 58' of the differential signal line 58 corresponding to the hollowed out portion 68 of the impedance reference planes 64 and 66 has a higher common mode impedance (for example of the order of 80 to 130 ohm) than the remainder of the differential signal line 58 that lies between the impedance reference planes. The actual value of the higher mode impedance can be dependent upon other nearby planes and lines.

By increasing the width of the portions 54' and 56' of the individual lines 54 and 56 of the differential signal line in the region of the hollowed out portion 68 of the impedance reference planes 64 and 66, the differential impedance of the differential signal line can be maintained substantially constant over the entire length of the differential signal line 58. That is, a substantially constant differential impedance per unit length can be maintained for each portion of the differential signal line 58.

Broadside coupled differential lines 58 can be used to facilitate maintenance of the differential impedance through the filter segment formed by the hollowed out portion 68 so that a small increase only of the line width is sufficient. The length of the differential signal line 58 between the IC contacts 44 and 46 and the filter formed at the hollowed out portion 68 is selected dependent upon the lowest frequency to be filtered, for example at least half of the wavelength of the lowest frequency to be filtered (e.g., 30 mm for 2.5 GHz).

Figure 6:
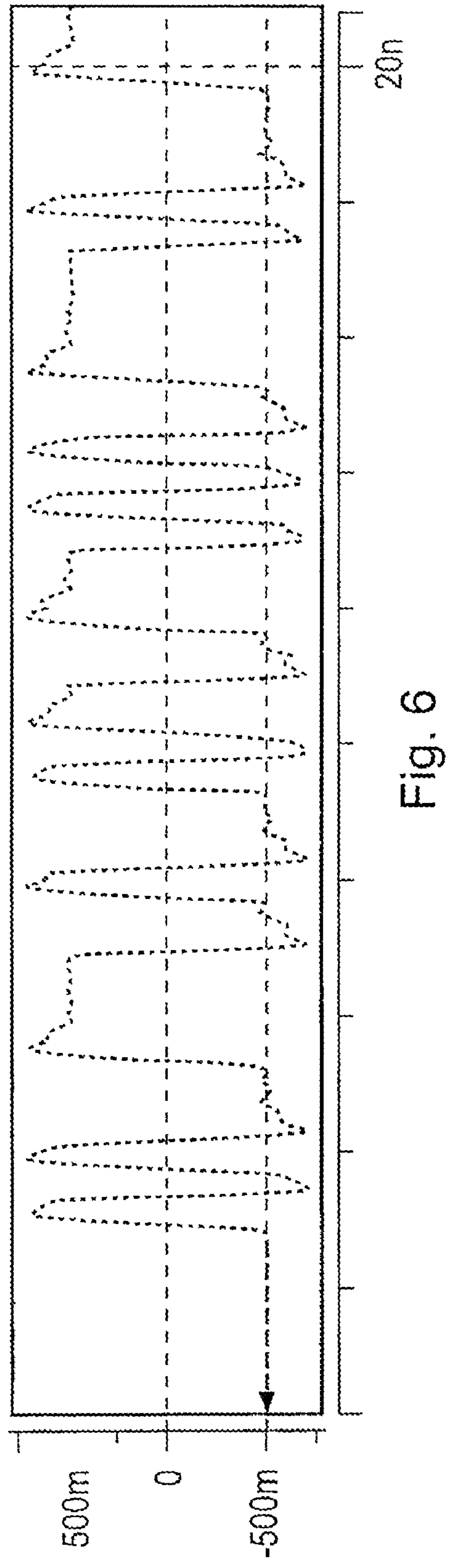
FIG. 6 is a representation of differential data at the outputs of an integrated circuit.

FIG. 6 is a representation of an example of differential data patterns presented at the outputs of an integrated circuit. This emphasizes over and under shoots after the transients.

Figure 7:
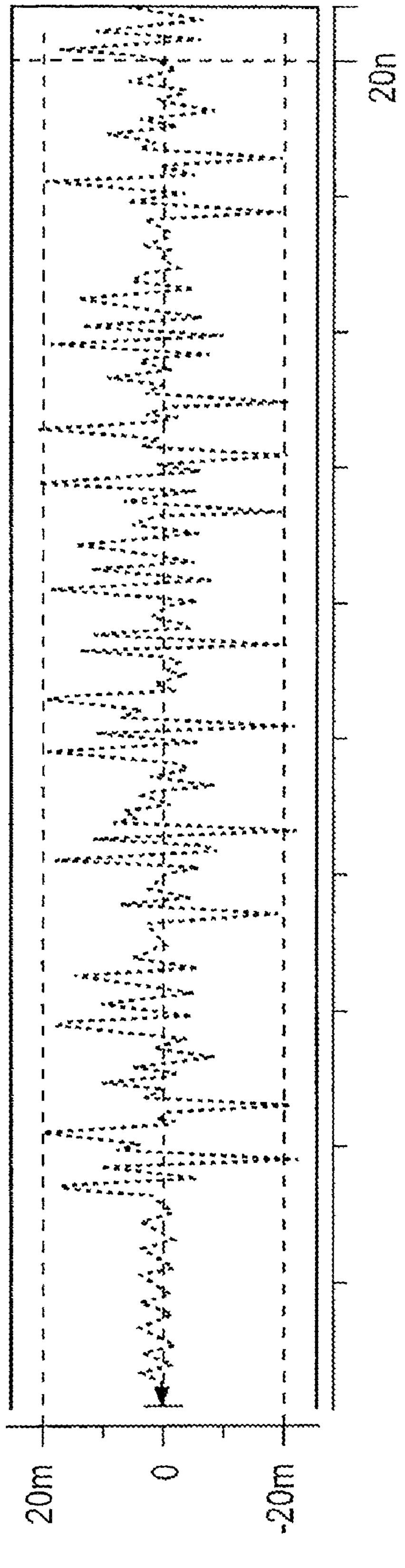
FIG. 7 illustrates an example of common mode noise.

FIG. 7 illustrates an example of common mode noise, being a mixture of clock noise (clock-CM) from the integrated circuit and generated common mode noise from data transients, passing unbalanced (asymmetrical) differential line elements (line-CM). The amplitude of the clock-CM is seen at the first two nanoseconds of the wave form before the data transients start. Even if the peak to peak values of the line-CM is four to five times higher than the clock-CM, the frequency spectrum (FFT) shows peaks from the clock-CM 6-7 dB higher than the line-CM because the line-DM averages over time.

Figure 8:
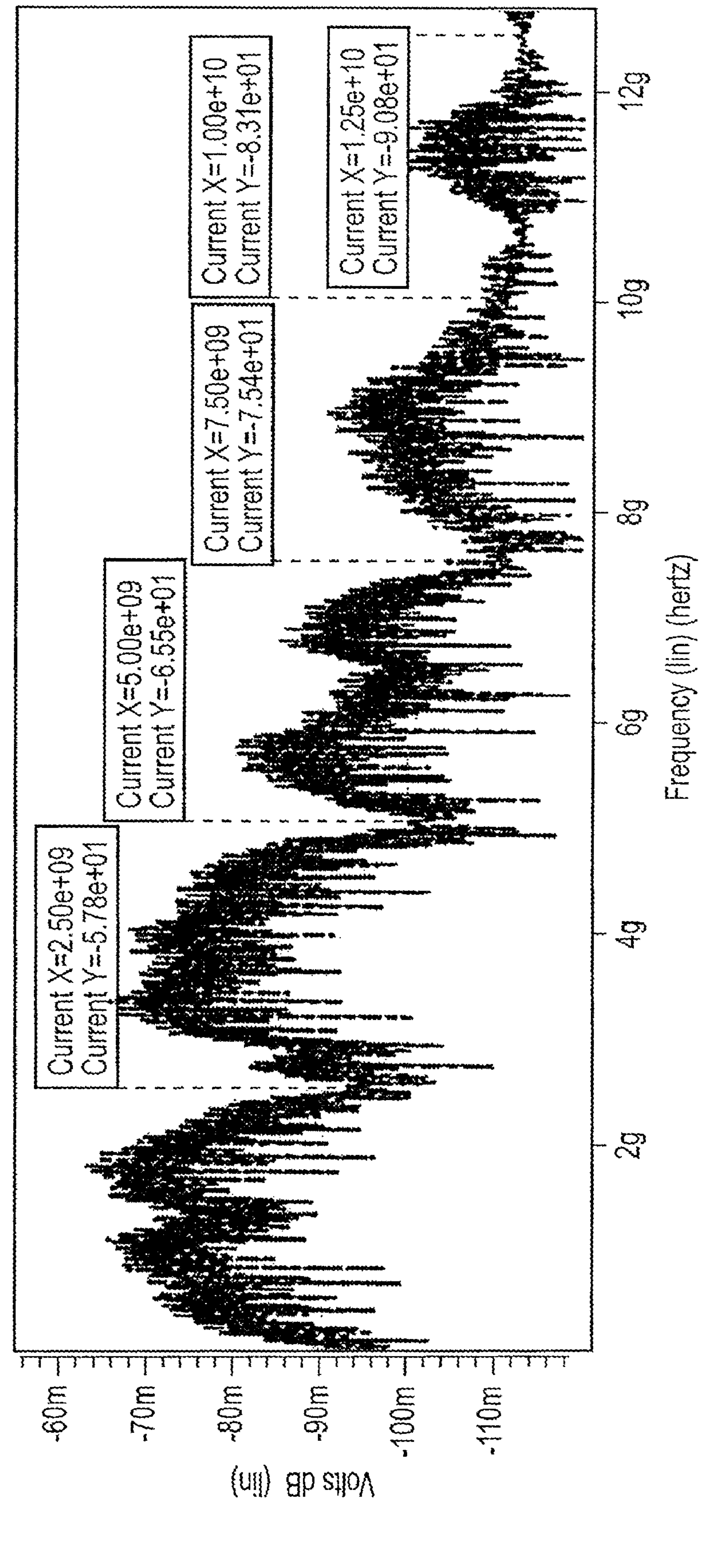
FIGS. 8 and 9 provide an illustrative comparison of unfiltered versus filtered common mode signals.
Figure 9:
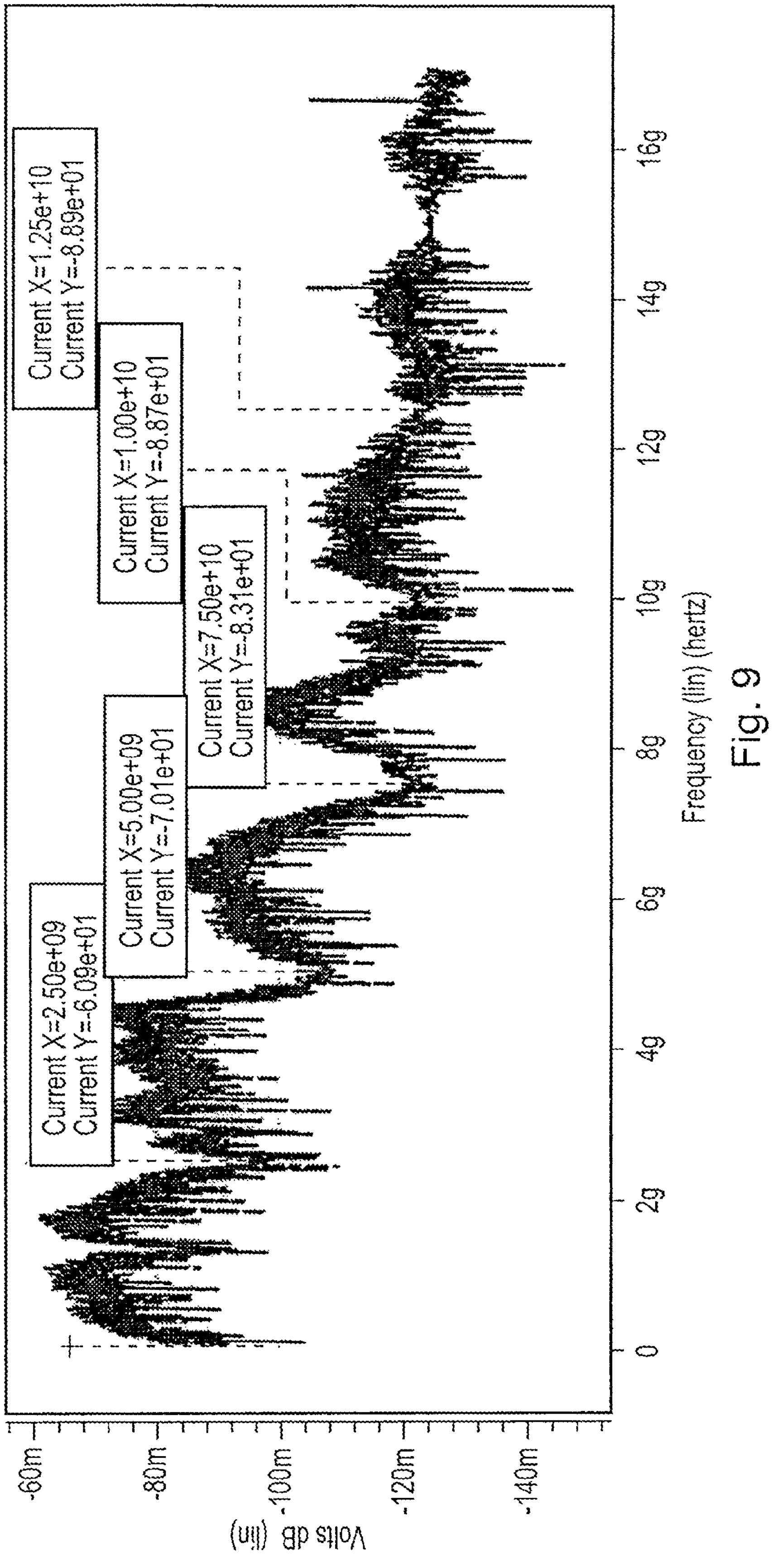

FIGS. 8 and 9 provide an example of the effect of filtering using an example of the present invention. FIG. 8 represents an unfiltered signal, whereas FIG. 9 represents a filtered signal. In the example shown in FIGS. 8 and 9, the clock-CM peaks are reduced by 3 dB at 2.5 GHz, 7 dB at 5 GHz and 9 dB at 7.5 GHz. This is represented in Table 1 below.

TABLE 1

FILTERED VERSUS UNFILTERED

| FREQUENCY (GHz) | UNFILTERED (dBV) | FILTERED (dBV) | GAIN (dB) |
|---|---|---|---|
| 2.5 | −57.8 | −60.9 | 3.1 |
| 5.0 | −65.5 | −72.1 | 6.6 |
| 7.5 | −75.4 | −84.4 | 9 |
| 10.0 | −83.1 | −88.7 | 5.6 |

In an example of the present invention, by suitably configuring the size and shape of the hollowed out portion in the impedance reference plane, and by adjusting the width of the differential signal lines in the portion of the hollowed out portion of the impedance reference planes, the differential impedance of the line into the filter, the filter itself and the line after the filter, can be said to be equal with negligible added differential loss.

It will be appreciated that FIGS. 4 and 5 are merely schematic representations of the provision of a hollowed out portion of the impedance reference planes and the adjusted width of the individual signal lines of the differential signal line. In practice, the printed circuit board 40 will comprise many individual signal lines and can comprise a plurality of integrated circuits and other discrete components. In an example of the invention one or more, possibly all, of the differential signal lines will be provided with an embedded filter as described with reference to FIGS. 4 and 5 in order to mitigate the effect of noise from an integrated circuit spreading through a PCB.

There has been described a method and apparatus to provide filtering of clock noise from an integrated circuit, wherein at least one differential signal line connected to the integrated circuit is provided with an embedded common mode filter. The common mode filter can be provided in the form of a hollowed out portion of an impedance reference plane.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A circuit board configured to have an integrated circuit mounted thereon and comprising at least one differential signal line to be connected to the integrated circuit, the differential signal line being provided with a first portion having a higher common mode impedance than another portion of the differential signal line, the circuit board further comprising an impedance reference plane that has a hollow in a region of the first portion to provide that portion with the higher common mode impedance, the portion of higher common mode impedance being configured to provide a common mode noise filter.

2. The circuit board of claim 1, wherein the hollow extends for approximately 10 mm along the differential signal line.

3. The circuit board of claim 1, wherein the hollow is formed at a distance along the differential signal line from a contact to which the integrated circuit is connected of at least half the wavelength of the lowest frequency component to be filtered.

4. The circuit board of claim 1, wherein the differential signal line is configured to provide a substantially constant differential impedance along its length.

5. The circuit board of claim 1, wherein the width of each portion of the differential signal line is chosen to provide a substantially constant differential impedance per unit length along the differential signal line.

6. The circuit board of claim 1, comprising a plurality of differential signal lines.

7. The circuit board of claim 1, comprising broadside coupled differential signal lines.

8. A circuit board having at least one integrated circuit mounted thereon, the circuit board further comprising at least one differential signal line connected to the integrated circuit, the differential signal line being provided with a first portion having a higher common mode impedance than another portion of the differential signal line, the circuit board further comprising an impedance reference plane that has a hollow in a region of the first portion to provide that portion with the higher common mode impedance, the portion of higher common mode impedance being configured to provide a common mode noise filter.

9. A method of filtering clock noise from an integrated circuit, the method comprising providing at least one differential signal line connected to the integrated circuit with an embedded common mode filter, wherein the differential signal line is provided with a portion having a higher common mode impedance than another portion of the differential signal line to form the embedded common mode filter; and providing a hollow in an impedance reference plane in the region of the differential signal line portion having the higher common mode impedance to provide that portion of the differential signal line with the higher common mode impedance.

10. The method of claim 9, comprising providing a distance that the hollow extends along the differential filter line according to a desired filter characteristic.

11. The method of claim 9, wherein the hollow extends for approximately 10 mm along the differential signal line.

12. The method of claim 9, comprising providing the hollow at a distance along the differential signal line from a pin of the integrated circuit to which the differential signal line is connected according to the lowest frequency to be filtered.

13. The method of claim 9, comprising providing the differential signal line with a substantially constant differential impedance along its length.

14. The method of claim 9, comprising configuring a width of each portion of the differential signal line to provide a substantially constant differential impedance per unit length along the differential signal line.

* * * * *